(12) United States Patent
Sorotzkin

(10) Patent No.: US 7,321,781 B2
(45) Date of Patent: Jan. 22, 2008

(54) CELLULAR TELEPHONE DESIGN FOR THE ELDERLY

(76) Inventor: Moshe Sorotzkin, Kiryat Tez-Stone, POB 71, D.N. Harei Yehudah (IL) 90840

( * ) Notice: Subject to any disclaimer, the term of this patent is extended or adjusted under 35 U.S.C. 154(b) by 660 days.

(21) Appl. No.: 10/925,245

(22) Filed: Aug. 24, 2004

(65) Prior Publication Data
US 2006/0079269 A1 Apr. 13, 2006

(51) Int. Cl.
*H04M 1/00* (2006.01)
(52) U.S. Cl. ............... 455/550.1; 455/90.3; 455/575.1; 455/575.3; 455/575.4; 379/52; 379/433.04; 379/433.06; 379/433.07; 379/433.13
(58) Field of Classification Search ............ 455/575.1, 455/575.3, 575.4, 90.3, 564, 550.1, 575.8; 379/52, 368, 433.06, 433.07, 433.13, 433.04
See application file for complete search history.

(56) References Cited

U.S. PATENT DOCUMENTS

| | | | |
|---|---|---|---|
| 4,947,432 A | 8/1990 | T pholm | 381/68.2 |
| 5,247,565 A | 9/1993 | Joglekar et al. | 379/58 |
| 5,729,221 A | 3/1998 | Krolopp et al. | 341/22 |
| 5,896,129 A | 4/1999 | Murphy et al. | 345/324 |
| 5,969,774 A | 10/1999 | Wininger | 348/734 |
| 5,983,514 A | 11/1999 | Lindsey | 33/760 |
| 6,035,220 A | 3/2000 | Claudio et al. | 455/564 |
| 6,044,257 A * | 3/2000 | Boling et al. | 455/404.2 |
| 6,064,734 A | 5/2000 | Hasegawa et al. | 379/433 |
| 6,067,011 A | 5/2000 | Leslie | 340/468 |
| 6,278,884 B1 | 8/2001 | Kim | 455/556 |
| 6,671,351 B2 | 12/2003 | Menard et al. | 379/45 |
| 7,107,219 B2 * | 9/2006 | Nemoto | 704/271 |
| 7,110,797 B2 * | 9/2006 | Soejima | 455/575.1 |

2003/0081767 A1 * 5/2003 Montague ............. 379/433.07

(Continued)

FOREIGN PATENT DOCUMENTS

GB 2308940 9/1997

(Continued)

OTHER PUBLICATIONS

Braille Speakerphone with Large Numbers, Item 127 100, Independent Living Aide Inc., at www.independentliving.com, May 13, 2004.

(Continued)

*Primary Examiner*—Matthew D. Anderson
*Assistant Examiner*—Sujatha Sharma
(74) *Attorney, Agent, or Firm*—Steven Horowitz

(57) ABSTRACT

A cellular telephone designed specifically to be visually appealing and practical for the elderly and those with reduced dexterity. Although the keypad buttons on the cellular telephone are approximately 260 square millimeters and have large spaces between adjacent keys to reduce instances of pressing the wrong button and to optimize visibility of the character digits on the key, the entire cellular telephone is approximately three inches wide, is lightweight and folds into a compact space, and can be held in one hand by an elderly individual. A large display is present. At least three jumbo integer keys are present on each portion of the foldable interactive surface. Unnecessary technological function keys are eliminated. Pressing the "HELP" key on the reverse side of the telephone body calls a medical or rescue service and displays medical information on the display.

28 Claims, 2 Drawing Sheets

U.S. PATENT DOCUMENTS

| | | |
|---|---|---|
| 2003/0104800 A1 | 6/2003 | Zak .............................. 455/404 |
| 2003/0226044 A1 | 12/2003 | Cupps et al. ................ 713/300 |
| 2004/0067784 A1* | 4/2004 | Kubo et al. .............. 455/575.4 |
| 2005/0215297 A1* | 9/2005 | Aoki ........................ 455/575.3 |
| 2006/0140428 A1* | 6/2006 | Qi et al. ...................... 381/315 |
| 2006/0276232 A1* | 12/2006 | Engevold .................... 455/564 |

FOREIGN PATENT DOCUMENTS

JP        2003224636 A   *   8/2003

JP        2004254198 A   *   9/2004

OTHER PUBLICATIONS

Ameriphone's Amplifier Phone with Jumbo Buttons & Braille, Item 186258, Independent Living Aids, Inc., www.independentliving.com, May 13, 2004.

Article About Samsung Telephones, MAARIV Newspaper, Israel, Aug. 17, 2004.

* cited by examiner

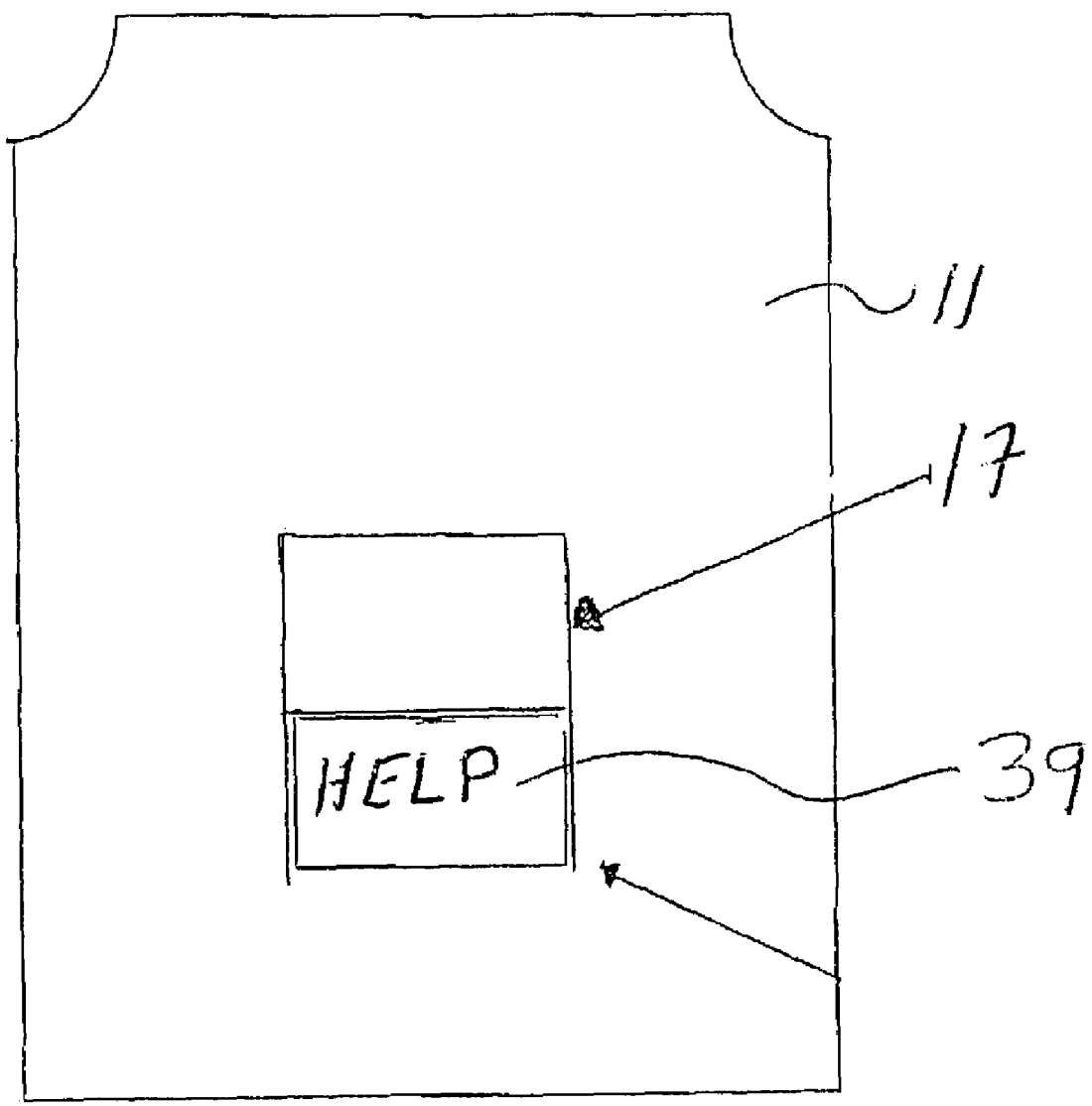

CELLULAR TELEPHONE DESIGN FOR THE ELDERLY

FIELD OF THE INVENTION

The field of this invention is the design of cellular telephones, and more particularly, the design of cell phones for the elderly.

BACKGROUND OF THE INVENTION AND DISCUSSION OF THE PRIOR ART

The number of people using cellular telephones has dramatically increased in the United States and foreign countries during the last decade. Yet their remains one segment of the U.S. and foreign population that still shies away from their use—the elderly. This admittedly imprecise term is not intended to refer merely to those who are approximately 80 years and over but even to those who are approximately 60 years old and over. Although there are many reasons for this phenomenon at least several reasons have to do with the physical nature of the cellular telephone.

A general reason is that cellular telephones do not work like "regular" land-line telephone. They work like a computer. Cellular telephones have several function keys that offer several different modes of operation. Only one of the modes is dialing a telephone number. Others include various acts of manipulating data such as storing a telephone number, retrieving a telephone number, recharging the telephone etc. Even the dialing mode is different for cellular telephones. As with a computer, one has to first enter the data or "send" the entered telephone number to the processor before the dialing actually occurs. The need to have to enter or "send" the dialed number to the processor is unfamiliar and odd for someone used to a regular telephone. As a result of the diverse functions, one's familiarity with how a plain land-line telephone works does not afford enough education as to how a cellular telephone works.

One specific reason is that cellular telephones have a feature wherein the same "CLEAR" button for shutting off the conversation to re-dial a new number is often the same key for shutting off the telephone. Often one push of the "CLEAR" key clears the dialed number from memory and affords the user the ability to dial a new number whereas either a harder press or a second press of the same key shuts off the whole telephone. This feature has a strong tendency to be "user-unfriendly" to the elderly—first of all it is too hard to push the key and second of all it is confusing that the same key does two different things.

A second specific reason many elderly individuals have shied away from the use of cellular telephones is that the manual act of dialing the telephone is harder. This is due to the small (and with each new design getting even smaller) size of the keypad keys representing the integers to be dialed. It is simply hard to see the keys. The other problem is that the keys to be dialed are close together and accidentally pressing the adjacent and wrong key occurs too frequently.

Related to this is the fact that when it does happen that the wrong number key has been pressed, the manner of undoing that mistake is not similar to the response to having mistakenly pressed the wrong digit of a plain land-line telephone. In that case, you hang up and redial. When a mistake is made while dialing a cellular telephone, do you shut off the phone and start again? Do you locate a button for erasing the last pressed digit, and if so, which button?. Do you restart the dialing mode? If you are a regular user of a cellular telephone you know the answer—you push the "CLEAR" button, assuming you can find it amidst all the tiny function buttons. If you are elderly or another type of individual who is not familiar with cellular telephones but is using one, you may not immediately know the solution and may be stymied and frustrated. Even if you learn about the "CLEAR" button, the fact that that same button/key is also used to shut off the entire telephone makes it confusing. The additional fact that this button is probably tiny is also a discomfort.

Moreover, while the "display" feature of a cellular telephone is designed to make it easier to avoid hitting the wrong key and letting you see what you are dialing or what have dialed, this solution to the discomfort is not effective since in most cellular telephones the area of the display is itself too small to achieve this purpose. Furthermore, the fact that something you dialed is displayed and you can see what you did does not necessarily render the process of dialing from small keys any less uncomfortable or confusing.

In the rush to offer more and more features to the cellular telephone users, and due to the urge to offer smaller and smaller cellular telephones, the above drawbacks of cellular telephone have been created and these drawbacks have caused a significant segment of the market, namely the elderly, those whose dexterity, hearing and/or sight are poor, to shy away from their use. While it might only be a minority segment of the purchasing public that view these characteristics as sufficient drawbacks that they refrain from using cellular telephones, the absolute numbers are very significant.

The present invention provides a cellular telephone that overcomes the disadvantages of the prior art and provides additional advantages.

SUMMARY OF THE PRESENT INVENTION

A cellular telephone designed specifically to be visually appealing and practical for the elderly and those with reduced dexterity, sight and/or hearing. The keypad buttons on the cellular telephone are approximately 200 to 300 square millimeters and have large spaces between adjacent keys to reduce instances of pressing the wrong button and to optimize visibility of the character digits on the key, yet the entire cellular telephone is approximately three inches wide, is lightweight and folds into a compact space, and can be held comfortably in one hand by an elderly individual. A large display is present. At least three jumbo integer keys are present on each portion of the foldable interactive surface. Unnecessary technological function keys are eliminated. Pressing the "HELP" key on the reverse side of the telephone body calls a medical or rescue service and simultaneously records/displays important medical information on the display for a rescuer/medical assistant to see.

IMPORTANT OBJECTS AND ADVANTAGES

The following important objects and advantages of the present invention are:

(1) to provide a cellular telephone that is appealing and comfortable for the elderly to use;

(2) to provide a cellular telephone that is appealing to individuals with low manual dexterity;

(3) to provide a cellular telephone that more resembles a plain old-fashioned land-line telephone in the way it functions;

(4) to provide a cellular telephone that is appealing to individuals with poor sight;

(5) to provide a cellular telephone whose keypad is not confusing;

(6) to provide a cellular telephone that in certain embodiments works in the mode of an ordinary telephone in that the "SEND" function is replaced by an algorithm for inputting based on a time lag and/or assumptions about the identity and length of the dialed digits;

(7) to provide a cellular telephone with a minimum number of function keys other than the ten integer digits, the "*" and "#" keys;

(8) to provide a cellular telephone that is not complex to operate;

(9) to provide a cellular telephone wherein the keys for dialing are approximately an order of magnitude greater in two dimensional area than the keys for dialing most cellular telephones;

(10) to provide a cellular telephone with the above features but that is still lightweight;

(11) to provide a cellular telephone that folds in half;

(12) to provide a cellular telephone that is somewhat wider than most popular cellular telephones in use which is nonetheless comfortable for an elderly person to hold in one hand;

(13) to provide a cellular telephone having a keypad with keys having large visually discernable symbols, and in certain embodiments the symbols being in white on a black background;

(14) to provide a foldable cellular telephone wherein the keypad includes keys on both sides of the hinge, i.e. on both halves of the interactive surface of the telephone body;

(15) to provide a cellular telephone suitable for the hard of hearing;

(16) to provide a cellular telephone that has a "PANIC" or "HELP" button on the back that is designed to not accidentally be pushed;

(17) to provide such a cellular telephone wherein pressing the "HELP" button not only calls a prearranged medical assistance location but also instantly displays pertinent information on the display screen;

(18) to provide a cellular telephone with a keypad whose keys are easy to press;

(19) to provide a cellular telephone wherein the jumbo integer keys are also spaced apart sufficiently to minimize the accidental pressing of the wrong key;

(20) to provide a cellular telephone whose design enables the telephone body to be narrow enough for an elderly person to hold and manipulate yet still accommodate jumbo integers spaced far enough apart to avoid accidental pressing of the wrong key;

(21) to provide a cellular telephone wherein the "OFF" function is controlled by a separate key (not the same as the "SEND" key and thus does not require an especially forceful pressing an a key;

(22) to provide a cellular telephone wherein volume controls can be used to ensure that the microphone can be adjusted to a higher decibel level that is appropriate for individuals who are hard of hearing;

(23) to provide a cellular telephone wherein the display area is large enough to display a large-sized digit, is almost as wide as the telephone body and occupies almost approximately one quarter of the entire available space on the interactive surface of the telephone body, yet still allows room for jumbo integer keys spaced far enough apart;

(24) to provide a cellular telephone wherein the display function simultaneously plays an audio of the dialed digit;

(25) to provide a cellular telephone wherein a gripping area is rounded to maximize comfort of holding the telephone body while using up the minimum of available space on the interactive surface of the telephone body; and

(26) to provide a cellular telephone that folds into a compact space.

BRIEF DESCRIPTION OF THE DRAWINGS

FIG. 2 is a top plan view of a portion of the rear of the telephone body of the cellular telephone of the present invention including the "HELP" button.

DETAILED DESCRIPTION OF THE PREFERRED EMBODIMENT

Figure 1:
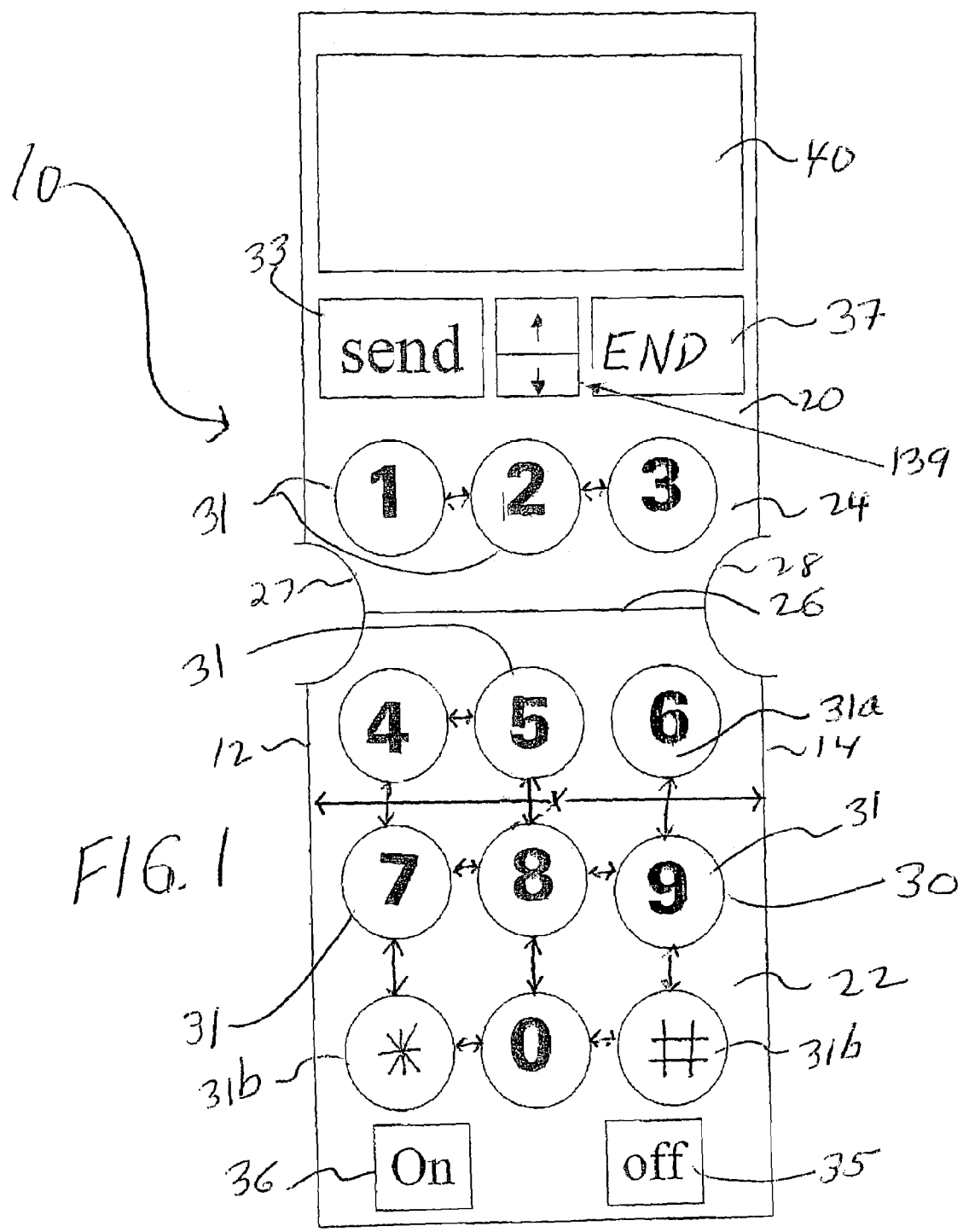
FIG. 1 is a top plan view of the interactive surface of the cellular telephone of the present invention.

The apparatus of the present invention will now be illustrated by reference to the accompanying drawings. The telephone body of the cellular telephone of the present invention has been assigned reference numeral 10 Other elements have been assigned the reference numerals referred to below.

As seen from FIGS. 1-2, a telephone body 10 has an interactive surface 20. Telephone body 10 is foldable. However, in an unfolded position telephone body 10 has a left vertical border 12 and a right vertical border 14. Telephone body 10 has a width between the left vertical border 12 and the right vertical border 14 of "X", representing a distance of between approximately two and one half inches and approximately three and one half inches. The preferred width is approximately three inches.

The term "interactive surface" 20 of the telephone body 10 is intended to encompass the keypad and display, that is, the portion of the front surface of the telephone body 10 in which the user interacts with the telephone.

The interactive surface 20 includes a first portion 22 of the interactive surface and a second portion 24 of the interactive surface, the first and second portions 22, 24 being separated by a folding area 26. That is, telephone body 20 folds along a folding area 26 between the first and second portions 22, 24 of the interactive surface 20.

In order to incorporate the largest possible jumbo integers while simultaneously ensuring that the telephone body of the present invention still be narrow enough for an elderly person to comfortably to hold in one hand, the left and right gripping areas are provided to narrow the telephone body at a central point of the telephone body, where it folds, and render the telephone body capable of comfortably being held in one hand. As a result of the narrowness of gripping area, the telephone body can be wider and still be graspable in one hand. The gripping area is also arced or rounded so as to dovetail with the human fingers and hand and maximize comfort. Thus, the front surface of telephone body 10 also includes a left gripping area 27 on a left side of the folding area 26 defined by a substantially arcuate indentation in the left vertical border 12 and a right gripping area 28 on a right side of the folding area 26 defined by a substantially arcuate indentation in the right vertical border 14.

Interactive surface 20 of the telephone body also includes keypad 30 occupying portions of both the first portion 22 and the second portion 24 of the interactive surface 20. Keypad 30 has jumbo integer keys 31 for integers between "0" and "9", a "SEND" key 33, an "OFF" key 35, a "CLEAR" key 37 and typically also a "*" key 31$b$ and a "#" key 31$b$. In certain embodiments, keypad 30 also includes an "ON" key 36. In a preferred embodiment, the keypad 30 has no other function keys.

The jumbo integer keys, measured in two dimensions, are much larger, approximately a full order of magnitude larger than those found on cellular telephone of the prior art. The jumbo keys are approximately 260 square millimeters in two-dimensional area. The size of these keys, should be large enough together with the space between the keys to accomplish the desired enhanced visibility of the keys and reduced likelihood of mis-pressed keys while not causing the width of the telephone body to exceed approximately three inches at its widest point. The range of two-dimensional area of the keys is between approximately 200 millimeters and approximately 320 millimeters.

In order to make keypad easily readable by the elderly and yet allow the telephone body 10 to be comfortably grasped by for the elderly or similar individuals while still fitting in the requisite keys, it has been found that the jumbo integer keys 31 and other data keys have certain physical characteristics. For example, the diameter of each of jumbo integer keys 31 is between approximately 16 millimeters and approximately 20 millimeters. In a preferred embodiment, the diameter is approximately 18 millimeters. This ensures that the keys of keypad 30 will be an order of magnitude larger than normally found on cell phones and thus much more visible but that the diameter of the keys on keypad 30 will not be so large that together with the significant spacing between adjacent keys the width of the telephone body 10 will be forced to significantly exceed three inches. For example, it is believed that if the width of telephone body 10 were to exceed three and one half inches it would significantly reduce the ease with which an elderly person could grasp and manipulate the telephone body 10 in one hand.

The diameter of the jumbo keys is preferably between approximately 16 and approximately 20 millimeters in one dimension. This means that any curve on the surface of the key is ignored and the diameter is measured in a line on a flat plane. In general, the "square area" or "two-dimensional area" as used in connection with the keys of the keypad 30 is calculated as if the top surface of the key is flat. Thus any concavity or convexity of the key does not affect the square area or two dimensional area. The surface area of a key having a convex surface may be larger than the square area or two dimensional area of the key.

As best seen from FIG. 1, in order to maintain the desired width of telephone body 10 yet avoid accidental pressing of the wrong key, the space between adjacent jumbo integer keys 31 in any horizontal row (see bi-directional arrows in FIG. 1) is between approximately 4 and approximately 6 millimeters. Further, in order to accommodate all the required jumbo integer keys 31, the minimum number of function keys and the display and still maintain a lightweight telephone that can preferably fit into one's pocket and can be easily manipulated, the space between adjacent jumbo integer keys in any vertical column (see bi-directional arrows in FIG. 1) within first portion 22 of interactive surface 24 should be maintained at between approximately 8 millimeters and approximately 12 millimeters. The term "vertical column" in this context means a vertical column consisting of two or more two rows within a particular portion of the interactive surface 20 (not spanning both the first 22 and second 24 portions of interactive surface 20).

Thus if only a single row of jumbo integer keys 31 appears on second portion 24 of interactive surface 20, then the parameters of the previous paragraph concerning spacing within vertical columns are stated with respect only to the first portion 22 of interactive surface 20. If, however, second portion 24 has two rows of jumbo integer keys 31, then the above parameters with respect to vertical column spacing apply equally to said second portion 24.

In order to make telephone body 10 be lightweight and fold into a compact space, vertical spacing between keys located on second portion 24 of interactive surface 20 should generally be within parameters similar to those stated with respect to vertical spacing on first portion 22 of interactive surface 20.

In general, the lengths of space between keys of keypad 30 are dictated by the objectives of the instant design, although the present invention would contemplate other lengths if they could accomplish all the design objectives.

The ideal space between adjacent jumbo keys 31 in a horizontal row is approximately 5 millimeters. The ideal space between adjacent jumbo keys 31 in a vertical column is approximately 10 millimeters.

It should be noted that, although possibly less important, the space between the "0" key and the "*" and "#" keys is also between approximately 4 millimeters and approximately 6 millimeters.

In a preferred embodiment of the present invention, in order to provide the largest jumbo integer keys on the keypad, the jumbo integer keys are to be found on both sides of the hinge or folding area 27 of interactive surface 20. As seen from FIG. 1, in order to make use of both the first and second portions 22, 24 of the interactive surface 20 for jumbo integer keys 31, the first portion and the second portion of the interactive surface each have at least three jumbo integer keys. Due to the waste of space that would arise from having an isolated jumbo integer key 31 in a row or column, in a preferred embodiment the first portion 22 will have all the jumbo integer keys except for one or two rows of three keys 31 each.

The front surface of telephone body 10 also includes a large display 40 on the interactive surface 20 that makes it possible to display a jumbo sized integer corresponding to the integer that appears on the jumbo integer key 31 that an elderly user presses. This occurs through technology well known to those involved in designing cellular telephones. Preferably, the jumbo size of the displayed integer should be of a size at least as large as the size appearing on the corresponding jumbo integer key.

As seen in FIG. 1, in a preferred embodiment, keypad 30 also has two volume control arrows 139 for adjusting a volume to a decibel level suitable for individuals with subnormal hearing. Instead of arrows, there could be any easily recognizable symbol advising the user that depression of that key increases or decreases the volume heard by the user as the case may be. Volume controls are used by the hard of hearing to increase the volume heard through the microphone during a call. It is possible to fit the volume controls in since modern technology has made it possible to render an effective microphone in a cellular telephone very small.

It should be noted that what is being spoken of is not necessarily individuals having severe or profound hearing loss in important speech frequencies but rather individuals having mild or moderate hearing loss. The cellular telephone of the present invention in a preferred embodiment incorporates a volume adjustment feature that addresses to such individuals. Such individual merely need a boost of decibel level of up to 25 decibels, depending on the severity of the condition. Such individual are typically not wearing hearing aids since they may not have severe enough hearing loss to require a hearing aid or may not have gotten around to getting a hearing aid.

The volume adjustment feature can adjust volume upward or downward but with respect to the upward adjustment, this feature enables the telephone of the present invention to adjust upward to a particular volume that represents the highest volume. That highest volume would be somewhere between approximately 2-3 decibels and approximately 25 decibels above the standard highest volume offered on cellular telephones sold in the United States not directed to the elderly or hard of hearing. It is noted that the average decibel level of the average conversation on a telephone is approximately 70 decibels. Accordingly, the highest volume available on the cellular telephone of the present invention measured in decibels would be somewhere between the low 70's and the mid-90's.

It is also noted that individuals with more severe hearing loss would be wearing hearing aids and it has been reported that the hearing aid antennas pick up the pulses of energy generated by digital network cellular telephones that work on digital cellular networks (most cellular telephones in the United States) and such interference makes impossible for them to use most cellular telephones.

Although FIG. 1 depicts the keypad 30 as including an "ON" button/key 36, in certain embodiments the keypad 30 may omit any "ON" key and rely on the fact that the telephone would turn on automatically, for example, when unfolded along folding area 26. It should be noted that the "OFF" key and the "SEND" key are separate to avoid the confusion from having the user learn that the same key does two different things. For example, this eliminates the situation where one push of the "SEND" key sends the entered number to the processor and two pushes or a more forceful push of the "SEND" key shuts off the cellular telephone. Although that seems at first blush to save space, it is definitely confusing for individuals such as the elderly and those with poor dexterity, sight and/or hearing. In the cellular telephone of the present invention, the keypad 30 has no key that performs different functions depending on a manner in which or a frequency with which said key is pressed.

The cellular telephone of the present invention also has a "HELP" key 39 for emergencies located on a rear surface 11 of the telephone body 10. A "HELP" key is understood to mean any key that has the word "HELP", "PANIC", "EMERGENCY" or any other word denoting emergency assistance. Furthermore, said "HELP" key is telephonically connected to a medical emergency service. Such service can be a general ambulance service, private or public, or it can be a "heart problem service" that advises the caller concerning heart problems. Such a heat problem service can be structured so that the person answering the call has the ability to ascertain the caller's pulse and other relevant medical information pertaining to the heart. This is because, the caller is a subscriber to the service and the caller's home contains equipment that the caller can be tested on wherein the results of such tests are automatically transmitted to the person answering the call at the service. Such a heart problem service exists in at least one country to the Applicant's knowledge, namely Israel.

Since the "HELP" or "PANIC" button is tied into an important medical service, the "HELP" or "PANIC" button is located on the rear of the telephone to avoid inadvertent pressing of this button. For the same reason, this button requires two actions—sliding a door 17 and pressing the button. One additional feature of the present invention is that by pressing the "HELP" button, the service is not only contacted but the display on the front of the telephone body of the cellular telephone automatically displays key medical information, such as the name and address of the patient, the name and telephone number of the person's doctor, the person's blood type, etc. This information is to be read by a rescuer so it need not be as large as the jumbo integer keys 31. Thus, more information can fit into display 40. As seen in FIG. 2, the "HELP" key is capable of being pressed only after separate prior movement is enacted, such as uncovering a covering element such as a sliding door. FIG. 2 can be understood ad depicting the part of the rear surface 11 of telephone body 10 that is opposite first portion 22 of interactive surface 20 or the part that is opposite second portion 24 of interactive surface 20.

It should be noted that since one of the purposes of the present invention is to minimize visual confusion for individuals who may have difficulty seeing, in certain embodiments, the jumbo integer symbols and function keys 31, 33, 35, 36 37 on the keypad 30 are white against a black background rather than the standard version of black on white. Reportedly research studies have shown that such a configuration is easier to read from than the standard black on white. In certain embodiments, moreover, there will also appear on all of the keys 31, 33, 35, 36, 37 raised Braille lettering 31a corresponding to the integers (notwithstanding the fact that FIG. 1 shows Braille lettering 31a present only on the "6" jumbo integer key 31).

In a preferred embodiment the large display 40 occupies almost the entire width of the telephone body 10. Moreover, display 40 preferably occupies almost approximately one fourth of the entire interactive surface 20 of the telephone body 10. Thus, the display 40 can display large renditions of the dialed telephone number and of the individual digits thereof. For further assistance to the elderly user having poor hearing, the key 31 pressed is not only displayed but in certain embodiments is also heard audibly. It is contemplated by the present invention, however, that in certain embodiments display 40 can be well short of the full width (or length) of interactive surface 20, or at least of the portion of said surface 20 in which display 40 exists.

It is also noted that the symbol on the jumbo integer keys 31 or on any key 33, 35, 37 can be anything that communicates the particular positive integer, or other symbol, including fro example raised lettering, or anything else. Purely, by way of example, the "CLEAR" button may have the word "END" or "END CALL" rather than the word "CLEAR", since those terms are likely to be less confusing to the elderly. Thus, notwithstanding the actual word depicted in the drawing, the present invention is definitely not limited to such words but rather these words are categories of symbols that convey the meaning of the function of the key in question.

The term "data key" as used herein means the integer keys, and the other character keys including the "*" key (known as the star key) or the "#" key (known as the "pound key" or the "number sign"). The data keys are typically substantially circular or square. The square area or two dimensional area of the key will be greater for the same "greatest width" (diameter of circle or width of square) if the key is square than of it is circular. Using ordinary algebra and geometry formulae such as $$A \text{ (area of a circle)} = D^2\pi/4,$$

we can see that if the key is circular, then requiring its two-dimensional area to be at least 150 square mm, requires its diameter to be at least approximately 13.8 mm, and if the key is square, then requiring its two-dimensional area to be at least 150 square mm forces the width of the key to be at least approximately 12.2 mm. Similarly, if the key is circular, then requiring its two-dimensional area to be at least 200 square mm, requires its diameter to be at least approximately 16.0 mm and if the key is square, the requiring its two-dimensional area to be at least 200 square mm requires its width to be at least approximately 14.1 mm. Similarly, if the key is circular, then requiring its two-dimensional area to be at least 250 square mm, requires its diameter to be at least approximately 17.8 mm and if the key is square, the requiring its two-dimensional area to be at least 200 square mm requires its width to be at least approximately 15.8 mm.

The preferable shape of the keys 31, 33, 35, 37 is round rather than square for the simple reason that is preferably to avoid any unnecessary space on the key pad 30, for example the corners of a square key 31, since such corners are not needed by the user. Preferably, the jumbo integer keys 31 and the other data keys 33, 35, 37 have diameters between approximately 16 and approximately 20 millimeters, or between approximately 200 and approximately 314 square millimeters. The preferred two dimensional size is approximately 260 millimeters squared.

The data keys on the keypad 30 can be either push button type in that they activated by depressing the key or the keys can be activated by touch triggering an electric circuit or a heat sensor or they can be activated by any other known means suitable for the present invention. In any case, the present invention requires all the data keys on interactive surface 20 to be easy to press as well as the function keys.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A cellular telephone for the elderly, comprising
a telephone body having an interactive surface and including in an unfolded position a left vertical border and a right vertical border, the telephone body having a width between the left and right vertical borders of between approximately two and one half inches and approximately three and one half inches,
the interactive surface including a first portion and a second portion, the telephone body folding along a folding area between the first and second portions of the interactive surface,
a left gripping area on a left side of the folding area defined by a substantially arcuate indentation in the left vertical border and a right gripping area on a right side of the folding area defined by a substantially arcuate indentation in the left vertical border,
a keypad on the first and second portions of the interactive surface and having jumbo integer keys for integers between "0" and "9", a "SEND" key, an "OFF" key, a "CLEAR" key, the keypad having no other function keys except that the keypad optionally includes a "*" key, a "#" key and/or an "ON" key, the jumbo integer keys having a diameter of between approximately 16 millimeters and approximately 20 millimeters, a space between adjacent jumbo integer keys in a horizontal row being between approximately 4 and approximately 6 millimeters and a space between adjacent jumbo integer keys in a vertical column being between approximately 8 and approximately 12 millimeters,
the first portion and the second portion of the interactive surface each have at least three jumbo integer keys, and
a display on the interactive surface that displays an integer in a jumbo size corresponding to a jumbo integer key that an elderly user has pressed, the jumbo size being at least a size appearing on the corresponding jumbo integer key.

2. The telephone of claim 1, wherein the keypad also has volume control arrows for adjusting a volume downward and upward, the upward adjustment allowing the telephone to reach a highest volume measured in decibels of between approximately 73 and approximately 95.

3. The telephone of claim 2, wherein the cellular telephone also has a "HELP" key for emergencies located on a rear surface of the telephone body, the "HELP" key capable of being pressed only after a covering element is uncovered.

4. The telephone of claim 3, wherein the "HELP" key, when pressed, displays basic medical information.

5. The telephone of claim 4, wherein the keypad does not have any "ON" key.

6. The telephone of claim 5, wherein the symbols on the keys are black against a white background.

7. The telephone of claim 6, wherein Braille lettering accompanies the integer on each jumbo integer key.

8. The telephone of claim 2, wherein the keypad has no "SEND" key and the telephone body has within it a processor programmed to "enter" a displayed telephone number according to an algorithm that considers a length of a lull after a certain number of digits have been entered.

9. The cellular telephone of claim 8, wherein the processor is also programmed to consider whether the displayed telephone number represents a domestic call or an international call.

10. The telephone of claim 8, wherein the cellular telephone also has a "HELP" key for emergencies located on a rear surface of the telephone body, the "HELP" key capable of being pressed only after a covering element is uncovered.

11. The telephone of claim 10, wherein the "HELP" key, when pressed, displays basic medical information.

12. The telephone of claim 2, wherein the keypad has no "OFF" key.

13. The telephone of claim 1, wherein the keypad has no "OFF" key and has a "HELP" key.

14. The telephone of claim 2, wherein the keypad has no key that performs different functions depending on a manner in which or a frequency with which said key is pressed.

15. The telephone of claim 14, wherein the cellular telephone also has a "HELP" key for emergencies located on a rear surface of the telephone body, the "HELP" key capable of being pressed only after a covering element is uncovered.

16. The telephone of claim 15, wherein the "HELP" key, when pressed, displays basic medical information.

17. The telephone of claim 16, wherein the keypad does not have any "ON" key.

18. The telephone of claim 17, wherein the symbols on the keys are black against a white background.

19. The telephone of claim 18, wherein Braille lettering accompanies the integer on each jumbo integer key.

20. The telephone of claim 1, wherein the width of the telephone body between the left and right vertical borders is between approximately two and three quarters inches and approximately three and one quarter inches.

21. The telephone of claim 20, wherein the keypad also has volume control arrows for adjusting a volume downward and upward, the upward adjustment allowing the telephone to reach a highest volume measured in decibels of between approximately 73 and approximately 95.

22. The telephone of claim 21, wherein the cellular telephone also has a "HELP" key for emergencies located on a rear surface of the telephone body, the "HELP" key capable of being pressed only after a covering element is uncovered.

23. The telephone of claim 22, wherein the "HELP" key, when pressed, displays basic medical information.

24. The telephone of claim 23, wherein the keypad does not have any "ON" key.

25. The telephone of claim 24, wherein the symbols on the keys are black against a white background.

26. The telephone of claim 25, wherein Braille lettering accompanies the integer on each jumbo integer key.

27. The telephone of claim 26, wherein the keypad has no "SEND" key and the telephone body has within it a processor programmed to "enter" a displayed telephone number according to an algorithm that considers a length of a lull after a certain number of digits have been entered.

28. The cellular telephone of claim 27, wherein the processor is also programmed to consider whether the displayed telephone number represents a domestic call or an international call.

* * * * *